United States Patent

Cothran et al.

[11] Patent Number: 4,655,986
[45] Date of Patent: Apr. 7, 1987

[54] BLOW MOLDED TUBING WITH SPECIAL HOLES AND METHOD OF MAKING SAME

[75] Inventors: Liggett A. Cothran, Clyde; Edward L. Morgan, Ashville, both of N.C.; Robert E. Stevens, Kettering, Ohio; Homer N. Holden, Sylva; R. Neal Ensley, Waynesville, both of N.C.

[73] Assignee: Dayco Products, Inc., Dayton, Ohio

[21] Appl. No.: 677,626

[22] Filed: Dec. 3, 1984

[51] Int. Cl.[4] .................................... F16L 11/11
[52] U.S. Cl. ......................... 264/508; 83/54; 138/121; 264/154; 428/36
[58] Field of Search ............... 138/121; 83/54; 156/242, 252; 428/36; 264/154, 508

[56] References Cited

U.S. PATENT DOCUMENTS

| | | | |
|---|---|---|---|
| 2,749,180 | 6/1956 | Andrews | 428/36 X |
| 3,391,424 | 7/1968 | Drossbach | 425/290 |
| 3,559,692 | 2/1971 | Mantelet | 138/121 |
| 3,747,352 | 7/1973 | Maroschak | 138/121 X |
| 3,789,615 | 2/1974 | Maroschak | 138/121 X |
| 3,802,202 | 4/1974 | Maroschak | 138/121 X |
| 3,861,152 | 1/1975 | Maroschak | 138/121 X |
| 3,861,153 | 1/1975 | Maroschak | 138/121 X |
| 3,926,222 | 12/1975 | Shroy et al. | 138/122 |
| 4,163,619 | 8/1979 | Fales | 138/121 X |
| 4,184,831 | 1/1980 | Hegler et al. | 425/290 |
| 4,245,924 | 1/1981 | Fouss et al. | 138/121 X |
| 4,360,042 | 11/1982 | Fouss et al. | 138/122 X |
| 4,374,079 | 2/1983 | Fouss et al. | 264/508 X |
| 4,415,389 | 11/1983 | Medford et al. | 428/36 X |
| 4,421,810 | 12/1983 | Rasmussen | 428/36 X |
| 4,424,834 | 1/1984 | Sumi et al. | 428/36 X |
| 4,523,613 | 6/1985 | Fouss et al. | 138/121 |

FOREIGN PATENT DOCUMENTS 47-38072  9/1972  Japan .................................. 264/508

Primary Examiner—Henry F. Epstein
Attorney, Agent, or Firm—Joseph V. Tassone

[57] ABSTRACT

A method of making blow-molded perforated tubing and the tubing made by said method is provided. In the method of the invention, hollow-walled protuberances are blow molded into the side of the tubing as the tubing is formed and perforations are formed by cutting the hollow-walled protuberances.

16 Claims, 7 Drawing Figures

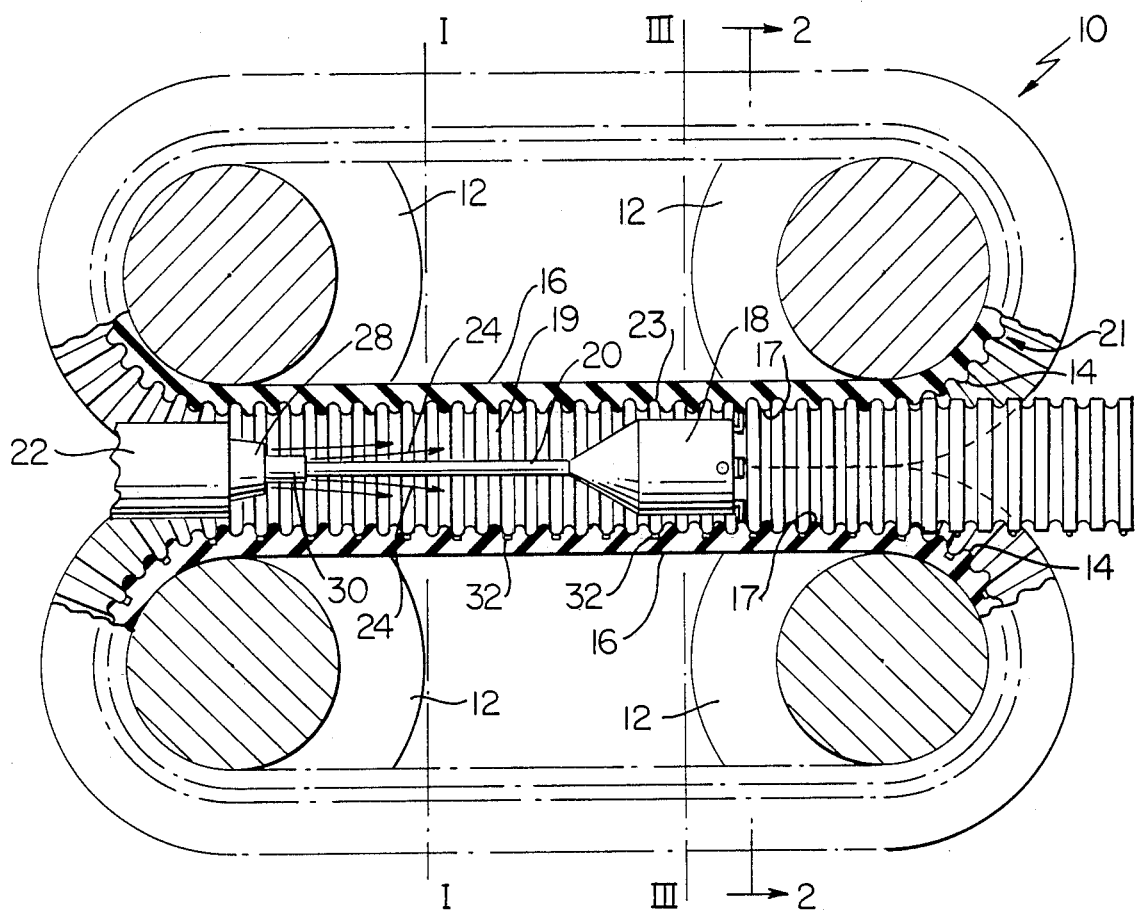
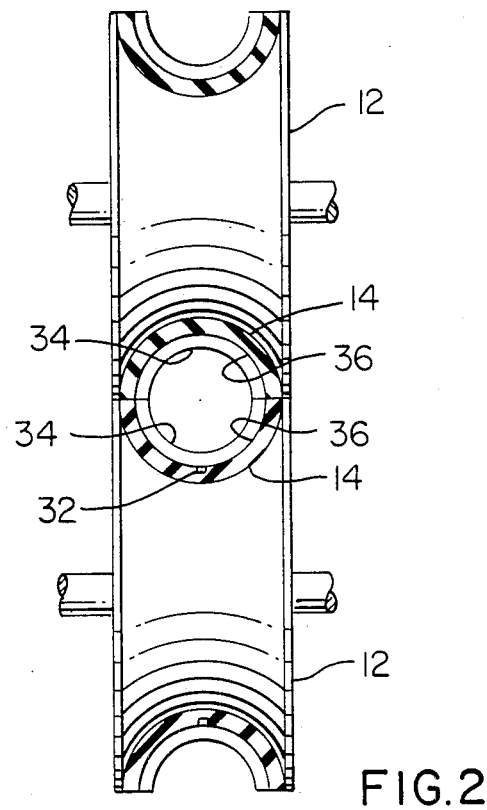
FIG.1
FIG.2

BLOW MOLDED TUBING WITH SPECIAL HOLES AND METHOD OF MAKING SAME

BACKGROUND OF THE INVENTION

1. Field of the Invention

This invention relates to a method of making blow-molded perforated tubing and perforated tubing made by said method. 2. Prior Art Statement Perforated tubing may be used for irrigation or for drainage. Conventionally, perforated tubing is made by first forming the tubing and then perforating the tubing by punching or by cutting holes in the tubing using a rotating hook knife or saw. In prior art methods, the materials used in the tubing had to be stiff to obtain good results since softer materials would tend to deflect away from the punch and the cutters.

Perforated tubing is often made in a corrugated configuration since the corrugations provide structural support for maintaining the shape of the tubing. Corrugated perforated tubing, and methods of making the same, are described in the following U.S. Patents:

| Inventor | U.S. Pat. No. | Date |
| --- | --- | --- |
| Hegler, et al | 4,184,831 | January 22, 1980 |
| Fales | 4,163,619 | August 7, 1979 |
| Maroschak | 3,861,153 | January 21, 1975 |
| Maroschak | 3,861,152 | January 21, 1975 |
| Maroschak | 3,802,202 | April 9, 1974 |
| Maroschak | 3,789,615 | February 5, 1974 |
| Maroschak | 3,747,352 | July 24, 1973 |

Conventionally, blow-molded corrugated tubing is made by a method and apparatus described in U.S. Pat. No. 3,391,424 to Drossbach, which was issued July 9, 1968. As described in the Drossbach patent, perforated tubing is made by blow molding the tubing using the apparatus apparatus illustrated in FIG. 1. and perforating the tubing using a rotating cutter as is illustrated in FIG. 5 therein.

SUMMARY OF THE INVENTION

In accordance with the present invention, there is provided a method for making perforated tubing. In the method of the invention, tubing is formed using a blow-molding technique, and perforations are cut in the completed tubing. The improvement in the method comprises the steps of molding hollow-walled protuberances on the tubing as it is formed, and cutting the hollow-walled protuberances using a rotating circular cutter to make the perforations.

Also provided, in accordance with this invention, is a blow-molded perforated tubing wherein the improvement comprises making said tubing having said perforations on a line parallel to the longitudinal center line of the tubing on the peaks of the corrugations. The tubing may also be made using a soft, flexible material.

It is an object of this invention to provide a new method of making perforated tubing which can be used equally well on soft materials as well as stiff materials.

Other aspects, embodiments, objects, and advantages of this invention will become apparent from the following specification, claims, and drawings.

BRIEF DESCRIPTION OF THE DRAWINGS

FIG. 1 is an elevational view, in axial section, of the principal parts of the apparatus used in the present method;

FIG. 2 is a cross-sectional view taken on line 2—2 of FIG. 1;

DETAILED DESCRIPTION OF THE PREFERRED EMBODIMENTS

Figure 3:
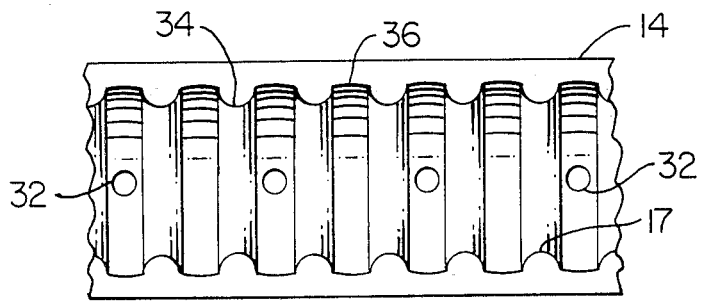
FIG. 3 is a side view rotated 90° of a section of the apparatus between lines I and III of FIG. 1.

FIG. 1 illustrates the preferred apparatus used to make the blow-molded corrugated tubing of the present invention. The apparatus illustrated in FIG. 1, in all essential respects, is the same as that described in the Drossbach patent, U.S. Pat. No. 3,391,424, and the description therein is incorporated herein by reference. The apparatus is generally represented by the number 10. The apparatus 10 comprises an extruder 22 with a conventional annular nozzle 28 from which is discharged a hot, semi-fluid elastomeric or plastic material into a cavity 19 defined by two mold halves represented by the reference number 14, having inner walls 16 and corrugated outer walls 21 having ribs 17 and valleys 23. Mold halves 14 are in the form of an endless band which are associated with a pair of driven rollers represented by the number 12, which drive the bands by contacting the walls 16. Holes 32 are drilled at intervals in at least one of the mold halves 14, typical holes being formed about 0.109 inch in diameter and about 0.156 inch deep. Air, represented by the arrows 24, is blown under pressure into the cavity 19 from one or more apertures in the inner core 30 of nozzle 28. The mold cavity 19 is substantially closed by a plug 18 which is floatingly supported on a flexible, preferably elastic rod 20 which projects axially from the nozzle core 30. The outside circumference of the plug is only slightly less than the inside circumference of the semi-circular ribs 17 which project inwardly from the walls 21 of the two mold halves 14. The air 24 forces the issuing material against the walls 21 following the corrugated configuration of the ribs 17 and valleys 23. Since the issuing material is deposited on the walls 21 in a relatively thin film, the plastic material which is blown into holes 32, causes hollow-walled protuberances to be formed in the resulting tubing in the shape of holes 32. With continuous unidirectional rotation of mold halves 14, the tubing is continually extruded by the apparatus as described.

The apparatus illustrated in FIG. 1 is used to make corrugated tubing. The present invention may be used in conjunction with any blow molding method or apparatus known in the art. As will be apparent to those skilled in the art, the present method may be used to make smooth tubing simply by using a smooth mold.

FIG. 2 illustrates the shape of the mold as it appears between driven rollers 12 along the line 2—2 in FIG. 1.

FIG. 3 illustrates a side view of the section in the area between dot-dash lines I and III in FIG. 1, illustrating troughs 34, peaks 36, and drill holes 32, which gives rise to the hollow-walled protuberance that is formed on the side of the tubing as it is blow molded when the material extruded from nozzle 28 is blown into the cavity of hole 32. Any air pressure, depending on the materials used, which is suitable in the blow-molding technique may be used in the method of the present invention. Preferably, the air pressure during such blow molding will be maintained at about 2½ to 20 psig.

As will be apparent to those skilled in the art, the thickness of the tubing produced in the molding operation depends on the amount of material blown into the mold, and the surface area of the mold. Since holes 32 have a larger surface area than the circular area of the mold that has been cut away to form holes 32, the hollow-walled protuberance formed on the tubing in the blow molding process will have much less thickness than the surrounding body of the tubing. Thus, the hollow-walled protuberance formed will have a thin gauge and will be relatively easy to cut.

Figure 4:
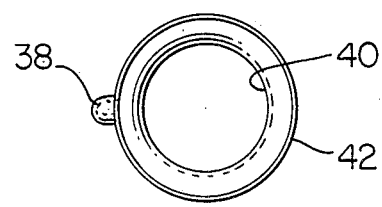
FIG. 4 is an end view of corrugated tubing having a hollow-walled protuberance formed by the method of the invention.

FIG. 4 illustrates an end view of the tubing of the invention as it is extruded. The hollow-walled protuberance formed is represented by the number 38, and the trough of the convolution is represented by the number 40 and the peak of the convolution is represented by the number 42. A typical tubing may have an I.D. of 0.550 inch and an O.D. of 0.6875 inch, and the corrugations may be formed with a pitch of 0.1236 inch.

As will be apparent to those skilled in the art, the tubing of the present invention can be made of any material which is suitable for making tubing using the blow molding method. Examples of such materials are illustrated by Drossbach in U.S. Pat. No. 3,391,424. In the method of the present invention, elastomers and plastics which are softer, more flexible and resilient than those required in the Drossbach method can also be used since the hollow-walled protuberances, when cut by the rotating circular blade cutter, as described below, cannot be deflected by the cutter. In its preferred embodiment, the tubing of the present invention will be made of copolymers of polyethylene.

Figure 5:
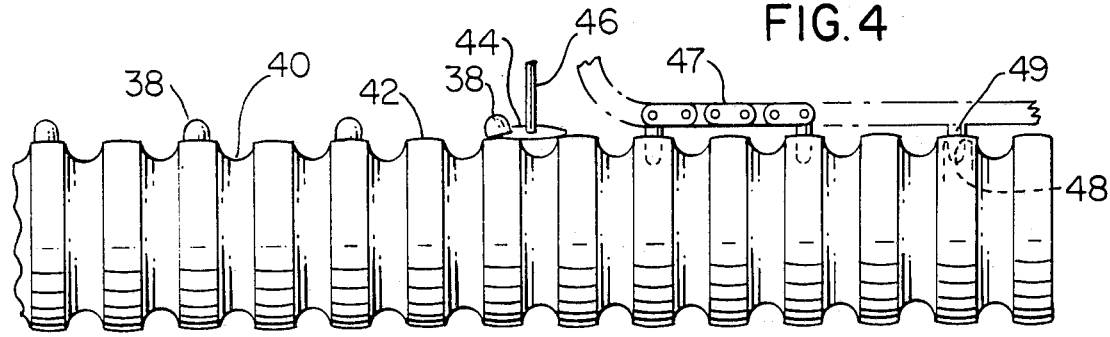
FIG. 5 is a side view of corrugated tubing having hollow-walled protuberances illustrating the rotating cutter used to remove said hollow-walled protuberances.

Referring now to FIG. 5, a side view of the tubing as it is extruded, is illustrated. FIG. 5 also illustrates a hollow-walled protuberance 38 being removed from the extruded tubing using cutter 46 which, in its preferred embodiment, has rotating circular blade 44 which is disposed substantially in a plane coinciding with the peaks of the corrugations. As will be apparent, since the hollow-walled protuberances on the side of the extruded tubing are above the above-mentioned plane of the peaks 42 of the corrugations, the hollow-walled protuberances 38 cannot deflect away from the cutter 46 to any appreciable extent, as the circular blade 44 makes contact. Since the material in the hollow-walled protuberance 38 cannot deflect away from blade 44, there is no requirement that the material used to form the holes be stiff or rigid, and a softer, flexible material can be used to form the tubing. In the preferred method of the invention, the hollow-walled protuberances are cut from the extruded tubing in a continuous process as the tubing is extruded. Since a separate cutting or punching step is not needed, the method of the present invention significantly reduces the amount of labor required to make the perforated tubing.

FIG. 5 also illustrates means represented by chain 47, which may be used to guide the tubing and keep the tubing on track for further processing in the apparatus. In the illustrated embodiment, teeth 49 contact the holes 48 substantially immediately after holes 48 are formed.

Figure 6:
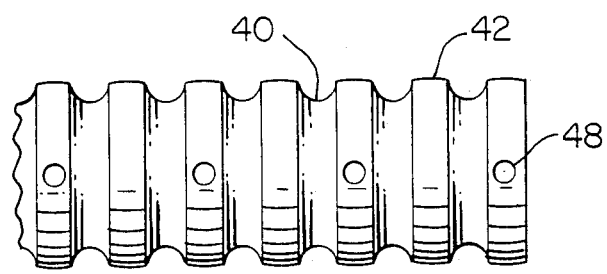
FIG. 6 illustrates a side view of the completed perforated tubing made by the method of the present invention having circular holes.
Figure 7:
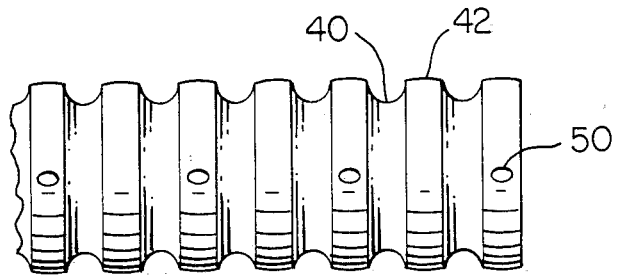
FIG. 7 illustrates a side view of corrugated tubing made according to the present method having oval shaped holes.

Using the method of the present invention, tubing with perforations of any desired shape may be made simply by making the hole 32 in the mold section the desired shape. For example, the hole 32 may be made in a square shape, a diamond shape, a triangle shape, or any other desired geometrical shape. For the purposes of the present invention, the preferred embodiment is illustrated as having perforations in a circular shape 48 (see FIG. 6) or an oval shape 50 (see FIG. 7). Also, using the method of the present invention, the holes can be placed within close tolerances on a center line along the longitudinal axis of the tubing. Accordingly, the hollow-walled protuberances, and the holes formed therefrom, can be used as a key, as described above, interacting with the extrusion apparatus, for keeping the tubing on track as it is extruded.

As mentioned above, the cutter 46 in its preferred embodiment will be disposed having the rotating circular blade 44 disposed in a plane substantially tangent to peaks 42 of the corrugations, preferably on the line on which said hollow-walled protuberances are disposed. Any cutter capable of such an orientation may be used. For the purposes of the present invention, a cutter having a rotating blade about 2½ inches in diameter which rotates at about 3000 rpm has been found to be suitable.

In the preferred embodiment, since the perforations are made on a line parallel to the longitudinal axis of the tubing, and are made on the peaks of the corrugations, the tubing of the preferred embodiment is preferably used for irrigation purposes. Other uses for the perforated tubing of the present invention will be readily apparent to those skilled in the art.

While present exemplary embodiments of this invention, and methods of practicing the same, have been illustrated and described, it will be recognized that this invention may be variously embodied and practiced within the scope of the following claims.

What is claimed is:

1. In a method of making irrigation or drainage perforated tubing utilizing a blow molding apparatus comprising the steps of blow molding said tubing and cutting said perforations therein, the improvement comprising during the blow molding step, molding hollow-walled protuberances on the outer surface of said tubing, severing said hollow-walled protuberances to form said perforations utilizing a rotating circular cutter and after said severing step, further processing said said tubing utilizing said perforations as keys to keep said tubing on track.

2. The method of claim 1 wherein during said molding step, forming corrugations in said tubing.

3. The method of claim 2 wherein during said molding step, said tubing is made from plastic material.

4. The method of claim 3 wherein said plastic material is soft and resilient.

5. The method of claim 1 wherein said blow molding step is performed at a blow pressure of about 2½ to 20 psig.

6. The method of claim 1 in which said perforated tubing is made continuously.

7. The method of claim 1 wherein said hollow-walled protuberances are molded on only one side of said tubing.

8. The method of claim 1 wherein a rotating circular cutter is used in said severing step and comprises a circular blade about 2½ inches in diameter which rotates at about 3,000 rpm.

9. The method of claim 1 wherein during said blow molding step said protuberances and said resulting perforations are located substantially on a line parallel to the longitudinal axis of said tubing.

10. The method of claim 2 wherein during said blow molding step, said protuberances are formed on the peaks of said corrugations in said tubing.

11. The method of claim 1 wherein during said blow molding step, said perforations are formed in a circular shape.

12. The method of claim 1 wherein during said blow molding step, said perforations are formed in an oval shape.

13. The method of claim 1 wherein during said blow molding step, said tubing is formed with an I.D. of 0.550 inch and an O.D. of 0.6875 inch.

14. The method of claim 2 wherein said molded corrugations have a pitch of 0.1236 inch.

15. The method of claim 1 further comprising the step of providing holes on at least one side of said molding apparatus to form said protuberances, wherein said holes in said molding apparatus are formed about 0.109 inch in diameter and about 0.156 inch deep.

16. A method for blow molding perforated tubing comprising:

injecting semi-fluid plastic material from an extruder having a nozzle for discharging said semi-fluid material into a blow molding apparatus comprising a cavity defined by two complementary mold halves at least one of said halves having a plurality of holes formed therein each of said mold halves having the form of an endless band wound about a respective pair of driven rollers;

blowing air under pressure into the nozzle end of said cavity;

substantially closing the cavity end most remote from said nozzle;

forming protuberances in said tubing utilizing said holes;

severing said protuberances from said tubing as said tubing exits said blow molding apparatus thereby forming perforations therein; and after said severing step, processing said tubing utilizing said perforations as keys for maintaining said tubing on track.

* * * * *